RAY C. EDWARDS
INVENTOR.

United States Patent Office 3,316,959
Patented May 2, 1967

3,316,959
SYSTEM AND APPARATUS FOR MAINTAINING A CONSTANT TEMPERATURE IN A PLURALITY OF ROOMS
Ray C. Edwards, Pompton Plains, N.J.
(396 Ski Trail, Smoke Rise, Kinnelon, N.J. 07405)
Filed Nov. 14, 1963, Ser. No. 323,623
3 Claims. (Cl. 165—22)

This invention relates to a control system for providing constant room temperature or constant discharge air temperature from a fan coil air conditioning apparatus.

Up to this time the approved apparatus to provide constant room temperature air comprised the automatic control apparatus and the air conditioning apparatus would consist of a fan, a cooling coil, a heating coil, a discharge air thermostat or a room thermostat, and modulating valves controlled by the thermostat but located in the pipe line carrying heating medium to the heating coil and in the pipe line carrying cooling medium to the cooling coil.

In the case of the heating coil it has been necessary to use a special type of non-freeze steam coil, particularly where 100% air was used, in order to prevent the freeze up of the coil. This is an expensive coil and requires the use of a steam boiler. Today it is normally the current practice to use water boilers rather than steam boilers. This adds an extra boiler cost to the installation costs of the equipment.

Cooling coils, up to this date, invariably used ordinary water without an anti-freeze solution and, therefore, if the heating coil were to fail (which happened with more or less frequency) the cooling coil could freeze unless drained. However, the drainage of the cooling coil necessitated the removing of the cooling mechanism from the apparatus, and thereby prevent its use during autumn and spring seasons when heating and cooling might be simultaneously, or alternately required.

The control apparatus normally used has been of the modulating type, either electric or air which is very expensive and requires installation by specially trained personnel.

The present invention consists of a combination of a fan and a single heat transfer coil and a control operation which gives the effect of the modulating control but requires only on and off motorized valves and thermostats which are invariably less complicated and costly than the modulating type. The modulating effect is accomplished by the installation of a storage tank in series with the coil and a circulating pump.

In normal operation, the circulating pump is run continuously and water from the storage tank is continuously circulated through the heat transfer coil. At intervals when demanded by the on and off thermostat, either cold water from a chiller, or hot water from a boiler is fed into a coil immersed in the tank. By this means the water in the tank is either heated or cooled depending upon the demand of the room thermostat or the discharge air thermostat.

The tank acts as a ballast or heat sink to prevent excessive cycling of the system when the heating and cooling source is cut off from the system.

The present system, with proper assemblage of the mechanism will provide constant air or room temperature as desired under control of simple on and off controls.

In the drawings.

FIGURE 1A is a completed extension of FIGURE 1 extended from the line A—A in FIGURE 1 and also shown in diagram.

Referring more particularly to the drawings, B and C indicate enclosures in which the temperature is maintained constant regardless of the ambient temperature. These inclosures may be rooms in a house, a public assembly room, motel or hotel rooms or, in fact, any room in which a predetermined uniform temperature is desired.

Two different types of temperature control are shown for the two enclosures, each however embodying the unit or system and apparatus of the present invention, and the specific arrangement shown in connection with enclosure B, while generally described herein will be embodied specifically and claimed in a separate application filed to be co-pending with the present application.

The air handling unit of the present invention includes a housing 1 located at any suitable location relative to the enclosure to be cooled, preferably above the ceiling D of such enclosure and where its open entrance or inlet end 2 is open to the ambient air of the enclosure.

Located inwardly of the inlet 2 is a filter 3', of any approved structure (which may be purchased on the open market) for filtering the incoming outside air.

Figure 3:
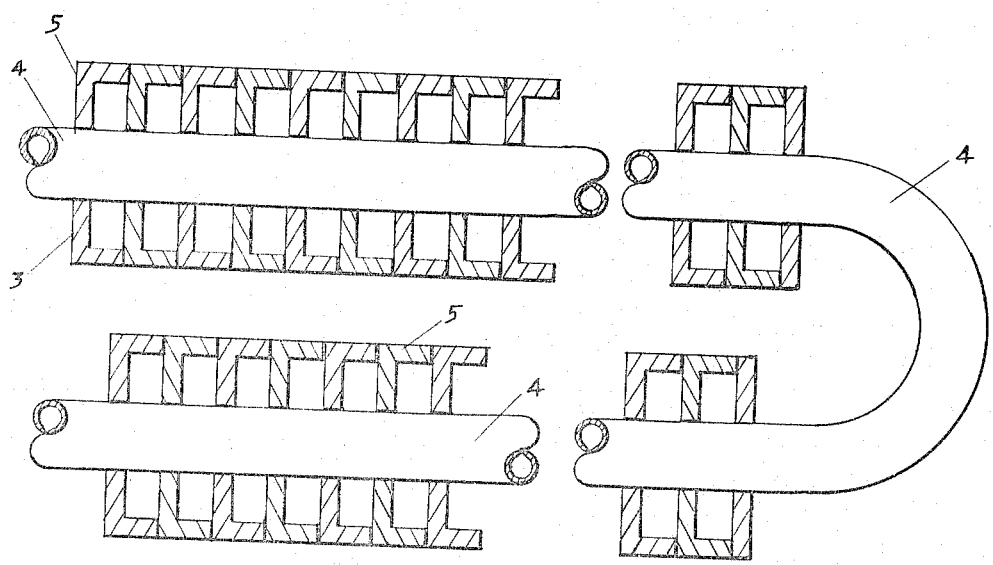
FIGURE 3 is a section through the cooling coil.

Directly inward of the filter is the heat transfer coil 3 which may be of any preferred type of structure but is preferably of the finned tube type embodying "Box-Fin" construction as shown clearly in FIGURE 3 of the drawings. The coil 3 may consist of a single length of "Box-Fin" construction or of a plurality of lengths thereof to form a continuous heat transfer coil, depending upon the size of the enclosure and the variance in the heat transfer desired.

Specifically the "Box Fin" coil consists of suitable fluid conducting tube or conduit 4 which extends through a plurality of fins 5 arranged to form a box like heat exchange fin structure on the tube, as shown and claimed in U.S. Patent No. 2,959,402, issued Nov 8, 1960. While this specific type of coil is shown it is to be understood that the invention is not limited to the use of such specific coil, but any approved efficient type of heat exchange coil may be used.

In the housing beyond the coil 3 is located a fan 6 of any approved type the inlet 7 of which opens into the interior of the housing 1 so as to receive air thereinto directly after the air has passed through the heat exchange coil 3.

The fan 6 discharges the air into a duct 8 which has outlet openings as shown at 9 into the enclosure.

A heating or a cooling medium is circulated through the tube 4 of the heat exchange coil 3 to regulate the temperature of the air passing through the coil.

Figure 1:
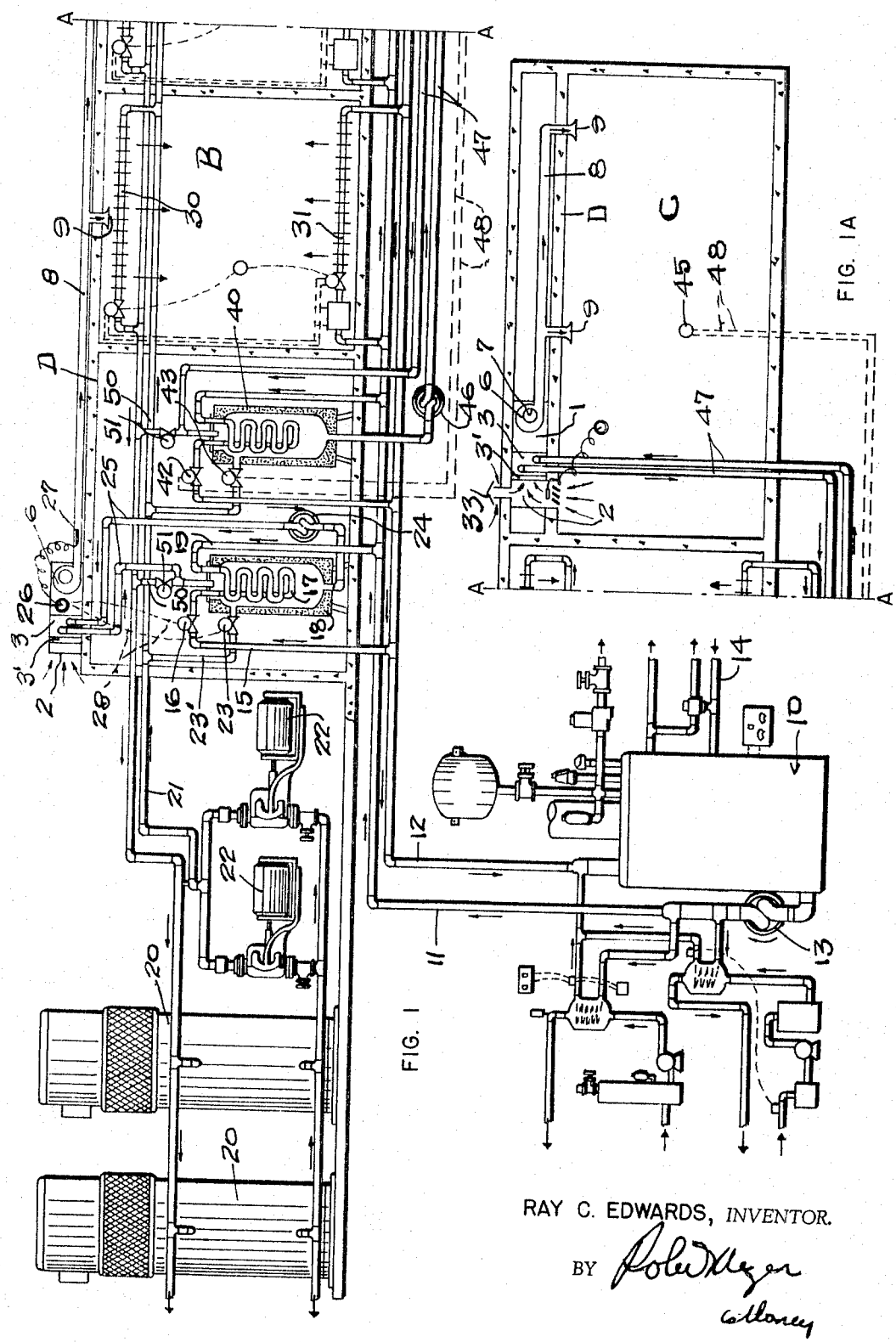
FIGURE 1 is a diagrammatic layout of the improved air handling unit.

FIGURE 1 of the drawings shows the mechanism for providing the heating or cooling medium to the coil 3.

A boiler 10 of a suitable water heating type is provided which has an outlet pipe 11 and an inlet pipe 12 connected thereto in its circulating system and a circulating pump 13 is provided to circulate the heated water. Inlet of make-up water to the boiler may be had from any suitable source through the inlet pipe 14.

The heated water is delivered through the pipe 15 through a motorized valve (i.e. an electric operated valve) of any suitable structure or type into the lower end of a coil 17 which is located in a storage tank 18 and returns from the coil 17 after passing therethrough through the return pipes 19 and 12 to the boiler.

A chiller 20, preferably of the type shown in application Ser. No. 232,730, filed Oct. 24, 1962 (although the application is not to be limited to the use of this specific chiller) is provided for cooling the water in the tank 18.

The water which is cooled in the chiller 20 is delivered into the tank 18 near the top of the tank through a pipe 21, by means of a circulating pump 22 such delivery being controlled by a motorized valve 23, of the same construction as the valve 16.

The water in the tank 18 is taken from the lower portion of the tank 18 by a circulating pump 24 and circulated through the heat exchange coil 3 and returned to the tank 18 by piping 25.

Different installation layouts of the apparatus is shown for the enclosures B and C and these will be described independently although the fundamental features of the temperature control of each enclosure is the same, and the different showings for the separate enclosures merely show different forms of installing the mechanism.

In the showing relative to enclosure or room B the housing 1 is shown as located outside the enclosure with its inlet open directly to the ambient air and the outlet 9 opening from the duct 8 into the enclosure, with the duct 8 extending on to a second enclosure. The air is discharged from outlet 9 over a coil 30 placed near the ceiling. This coil 30 is a cooling coil and receives cold water from the tank 18 through suitable connections, while hot water from the tank 18 is delivered through suitable connections to a heating coil 31 placed near the floor of the enclosure B. These coils 30 and 31 are provided to permit heating or cooling of the enclosure B independently of the system of the present invention and provide individual room temperature control in a multiple room building. This feature forms no part of the present invention and will be specifically defined and claimed in said co-pending application referred to above.

In connection with enclosure B a thermostat 26 is shown located in the housing 1 after the heat transfer coil 3 and with a thermo-bulb connection 27 located in the duct 8. The thermostat 26 which is a simple on and off thermostat (of any suitable type) which is set to operate at predetermined on and off temperatures under control of the thermo-bulb 27, thus under variances of the temperature of the air discharged by the fan 6.

The thermostat 26 is electrically connected in circuit with the motorized valves 16 and 23 as indicated at 28, and thereby the thermostat 26 controls operation of the valves 16 and 23 and consequently controls the flow of either hot water or cold water to the heat transfer coil 3 as required to maintain the constant desired temperature within the enclosure B.

Figure 2:
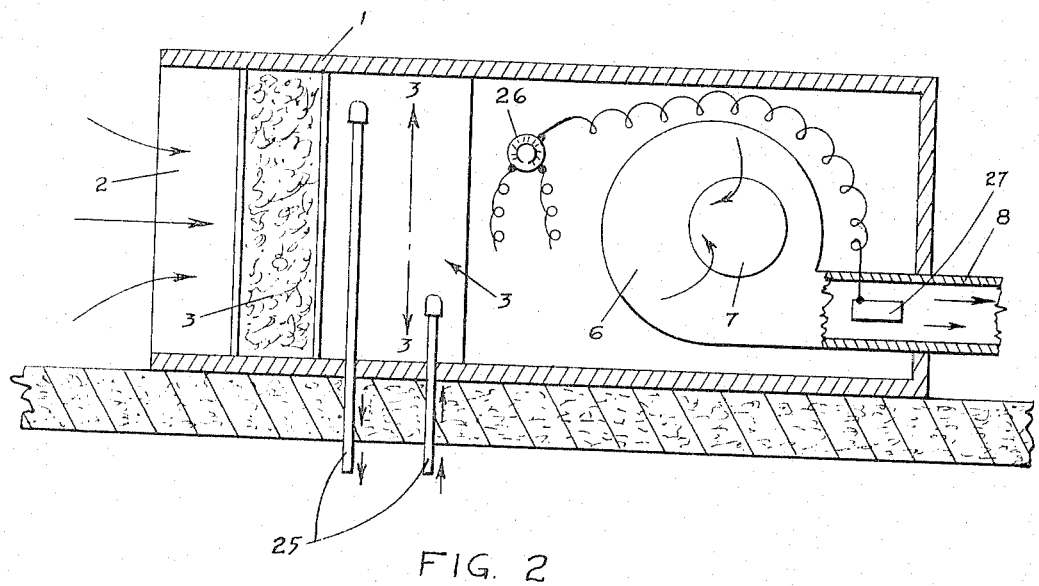
FIGURE 2 is a detail partly in section and showing the cooling coil and fan assembly.

In the arrangement shown in connection with enclosure C, in FIG. 1A of the drawings, the housing 1 is located in a space between the ceiling D and the roof or top of the enclosure and a flue 33 leads the outside air into the inlet chamber or space 2 of the housing 1. The housing 1 has a filter 3′, a heat transfer coil 3 and a fan 6 therein the same as shown in FIGURES 1 and 2. The fan 6 draws air from within the housing 1 after the air has passed through the heat exchange coil 3 and discharges the treated air into the duct 8, from whence it is discharged through ducts 9 into the enclosure.

In the drawings a second tank is shown and the water is delivered from this second tank to the coil 3 used in the arrangement shown in connection with enclosure C, but such a second tank is used only when the number of enclosures is such as to require a second tank and in fact a second chiller as is shown in FIGURE 1 of the drawings.

The use of the second tank 40, its associated mechanisms and pipes is merely to be considered as a modification of the arrangement shown in connection with enclosure B, as is also any variances between the arrangement of parts shown in connection with the two enclosures.

The tank 40 has a coil 41 therein through which hot water from the boiler 10 is circulated under control of a motorized valve 42 while cold water is delivered to the tank 40 from the chiller 20 under control of a motorized valve 43. The valves 42 and 43 are identical one with the other and with the motorized valves 16 and 23, all being simply open and closed, or on and off valves operated through suitable electrical connections (not shown) by the thermostats 26 and 45.

A circulating pump 46 circulates the water from the tank 40 through the coil 3 by means of suitable piping 47.

The motorized valves 42 and 43 are controlled by the thermostat 45, through suitable electrical connections indicated at 48 so that the flow of hot or cold water to the coil 3 will be under control of the temperature of air within the enclosure C.

Bypasses 50 are provided between the return water conduits from the coils 3 to the tanks 18 and 40 and these bypasses are controlled by valves 51, which may be automatically operated check valves (of any suitable available type) to prevent flow of an excessive quantity of water into the tanks and by-pass such excessive water into the return lines to the chiller 20.

From the foregoing taken in connection with the drawings, it will be apparent that a constant desired temperature may be maintained in the enclosures by simple inexpensive on and off thermostats and motorized valves, and that such temperatures may be maintained without human attention once the thermostats have been set.

The various structures shown in the drawings such as the appendages on the boiler 10 and connected thereto and the thermostat shown at 50 with its co-operating elements and not specifically described herein relate to other utilization of some of the features of the primary structures and are shown and described in my co-pending application, Ser. No. 323,622, filed Nov. 14, 1963, in no wise connected with the present invention.

What is claimed is:

1. In a heating and cooling system and apparatus for enclosures, means for maintaining a constant temperature in a plurality of rooms wholly independently of outside air temperature, or pressure including a fan delivering discharged air directly into a plurality of rooms, a heat exchanger arranged to vary the temperature of air entering the suction of said fan, means for delivering a heating or cooling fluid to said heat exchanger, a single thermostat actuated by variances in the temperature of air discharged into said room for controlling the temperature of heating or cooling fluid delivered to said heat exchanger, whereby a constant uniform temperature will be maintained simultaneously in all of the rooms, said means for delivering the heating or cooling fluid to the heat exchanger constitutes a tank, means for delivering chilled fluid into said tank, means for varying the temperature of the fluid in said tank, said single thermostat controlling the temperature variance of the fluid in said tank.

2. In a heating and cooling system and apparatus for enclosures, means for maintaining a constant temperature in a plurality of rooms wholly independently of outside air temperature, or pressure including a fan delivering discharged air directly into a plurality of rooms, a heat exchanger arranged to vary the temperature of air entering the suction of said fan, means for delivering a heating or cooling fluid to said heat exchanger, a single thermostat actuated by variances in the temperature of air discharged into said rooms for controlling the temperature of heating or cooling fluid delivered to said heat exchanger, whereby a constant uniform temperature will be maintained simultaneously in all of the rooms, said means for delivering the heating or cooling fluid to the heat exchanger constitutes a tank, means for delivering chilled fluid to said tank, means for delivering fluid from the tank to said heat exchanger, means for delivering a heated fluid to the tank to vary the temperature of fluid in the tank, and means in the tank to prevent intermingling of the chilled fluid in the tank and the heated fluid delivered to the tank, said single thermostat controlling the delivery of the heating fluid and chilled fluid delivered to the tank.

3. A heating and cooling system and apparatus for enclosures as claimed in claim 2 including a valve controlling delivery of chilled fluid to said tank, a valve controlling delivery of heated fluid to said tank and means associated with each of said valves and connected to said single thermostat to control operation of the valves by actuation of the thermostat under variances in temperature of air discharged into the rooms by said fan.

References Cited by the Examiner

UNITED STATES PATENTS

| | | | |
|---|---|---|---|
| 2,566,976 | 9/1951 | Bernstrom | 165—163 |
| 2,600,889 | 6/1952 | Lehane | 165—22 |
| 2,664,275 | 12/1953 | Carter | 165—163 |
| 2,739,792 | 3/1956 | Blum | 165—22 |

ROBERT A. O'LEARY, *Primary Examiner.*

CHARLES SUKALO, *Examiner.*